(12) United States Patent
Crow et al.

(10) Patent No.: US 10,706,374 B2
(45) Date of Patent: Jul. 7, 2020

(54) SYSTEM, APPARATUS, AND METHOD FOR GENERATING SECONDARY STAFFING SCHEDULES

(71) Applicant: Education Advanced, Inc., Tyler, TX (US)

(72) Inventors: J. Eli Crow, Tyler, TX (US); Kenneth L. Sikes, Tyler, TX (US); Shawn M. Rasure, Tyler, TX (US)

(73) Assignee: Education Advanced, Inc., Tyler, TX (US)

( * ) Notice: Subject to any disclaimer, the term of this patent is extended or adjusted under 35 U.S.C. 154(b) by 0 days.

(21) Appl. No.: 15/924,083

(22) Filed: Mar. 16, 2018

(65) Prior Publication Data

US 2019/0287042 A1    Sep. 19, 2019

(51) Int. Cl.
*G06Q 10/06* (2012.01)

(52) U.S. Cl.
CPC .......................... *G06Q 10/063112* (2013.01)

(58) Field of Classification Search
CPC ............................................. G06Q 10/063112
USPC ....................................................... 705/7.14
See application file for complete search history.

(56) References Cited

U.S. PATENT DOCUMENTS

| | | | | |
|---|---|---|---|---|
| 5,270,920 A | * | 12/1993 | Pearse .................... | G06Q 10/06 705/7.16 |
| 2004/0110119 A1 | * | 6/2004 | Riconda .................... | G09B 7/02 434/350 |
| 2004/0115596 A1 | * | 6/2004 | Snyder .................... | G09B 7/02 434/118 |
| 2005/0055256 A1 | * | 3/2005 | Scott .................... | G06Q 10/10 705/321 |
| 2006/0105315 A1 | * | 5/2006 | Shaver .................... | G06Q 10/02 434/362 |
| 2008/0050715 A1 | * | 2/2008 | Golczewski ..... | G06Q 10/06311 434/350 |
| 2011/0047224 A1 | * | 2/2011 | Fox .................... | G09B 7/02 709/206 |
| 2013/0022953 A1 | * | 1/2013 | van der Linden ....... | G09B 7/02 434/322 |
| 2017/0357759 A1 | * | 12/2017 | Stepaniuk .............. | G16H 10/60 |
| 2019/0080296 A1 | * | 3/2019 | Crow ................. | G06Q 10/1093 |

* cited by examiner

*Primary Examiner* — Folashade Anderson (57) ABSTRACT

Disclosed herein are aspects of a staff scheduling system for preparing a staffing schedule report for secondary education campuses of a school district. In one embodiment, a staff scheduler comprises at least one interface for receiving a plurality of inputs from at least one external computing device; and a processor configured to perform a staff scheduling algorithm to generate a staffing schedule report for the secondary education campuses, wherein the staff scheduling algorithm generates a series of input prompts and decisions based on the plurality of inputs. The plurality of inputs includes at least courses requested by students at each campus, current teachers available in the district, current teachers' qualifications, campus facility information, which courses may be shared at multiple campuses, and which staff may be shared by multiple campuses.

19 Claims, 8 Drawing Sheets

STAFF ANALYSIS REPORT
EL CAMPO H S

FIG. 5A

| Department | Category | Scheduled Sections | Teacher Sections | Analysis |
|---|---|---|---|---|
| CAREER AND TECHNICAL ED | AGRICULTURE | 34 | 36 | |
| | ARTS AUDIO VISUAL COMM | 14 | 11 | Understaffed: 3 |
| | COSMETOLOGY | 8 | 7 | |
| | CULINARY ARTS | 10 | 6 | Understaffed: 4 |
| | HEALTH SCIENCE | 4 | 7 | Overstaffed: 3 |
| | Human Services | 12 | 13 | |
| | AUTO TECH | 10 | 7 | Understaffed: 3 |
| | CAREER PREP | 6 | 4 | |
| | Total | 98 | 91 | |
| ELECTIVES | DEBATE | 3 | 3 | |
| | LEADERSHIP | 2 | 2 | |
| | COLLEGE READINESS | 1 | 1 | |
| | ORAL INTERPRETATION | 1 | 1 | |
| | CREDIT RECOVERY | 3 | 6 | Overstaffed: 3 |
| | AVID | 6 | 6 | |
| | Total | 16 | 19 | |
| ENGLISH AS SECOND LANGUAGE | ELA ESL | 4 | 3 | |
| | Total | 4 | 3 | |
| ENGLISH LANGUAGE ARTS | HS READING | 0 | 4 | Overstaffed: 4 |
| | JOURNALISM | 2 | 2 | |
| | READ WRITE INTERVENTION | 1 | 1 | |
| | SPEECH | 3 | 3 | |
| | DYSLEXIA | 0 | 3 | * |
| | HS ENGLISH | 41 | 51 | Overstaffed: 10 |
| | Total | 47 | 64 | |
| FINE ARTS | ART | 6 | 6 | |
| | BAND | 4 | 4 | |
| | CHOIR | 2 | 2 | |
| | DANCE | 9 | 9 | |
| | THEATRE ARTS | 3 | 3 | |
| | Total | 24 | 24 | |
| FOREIGN | SPANISH | 22 | 21 | |

FIG. 5B

Cardonex - Education Advanced, Inc.                                                                                                          10/07/2017

| Department | Category | Scheduled Sections | Teacher Sections | Analysis |
|---|---|---|---|---|
| LANGUAGE | | | | |
| | Total | 22 | 21 | |
| MATHEMATICS | HS MATH | 45 | 48 | Overstaffed: 3 |
| | MATH INTERVENTION | 1 | 3 | |
| | Total | 46 | 51 | |
| PHYSICAL ED/ HEALTH | ATHLETICS MIXED | 3 | 3 | |
| | CHEER LEADING | 1 | 1 | |
| | ATHLETICS BOYS | 6 | 20 | Overstaffed: 14 |
| | ATHLETICS GIRLS | 4 | 10 | Overstaffed: 6 |
| | PE MIXED | 8 | 10 | |
| | Total | 22 | 44 | |
| SCIENCE | CHEMISTRY | 11 | 14 | Overstaffed: 3 |
| | LIFE SCIENCE | 19 | 17 | |
| | PHYSICAL SCIENCE | 12 | 15 | Overstaffed: 3 |
| | PHYSICS | 3 | 3 | |
| | Total | 45 | 49 | |
| SOCIAL STUDIES | ECONOMICS | 4 | 8 | Overstaffed: 4 |
| | GEOGRAPHY | 13 | 24 | Overstaffed: 11 |
| | GOVERNMENT | 5 | 3 | |
| | HISTORY | 14 | 14 | |
| | Total | 36 | 49 | |
| SPECIAL ASSIGNMENT | CAREER PREP MONITOR | 0 | 3 | * |
| | IN CLASS SUPPORT | 0 | 12 | * |
| | LIBRARIAN | 0 | 1 | * |
| | LUNCH | 0 | 1 | * |
| | Total | 0 | 17 | |
| SPECIAL EDUCATION | INCLUSION SUPPORT | 0 | 23 | * |
| | LIFE SKILLS UNIT | 8 | 27 | Overstaffed: 19 |
| | RESOURCE HS ELA | 1 | 4 | Overstaffed: 3 |
| | RESOURCE HS MATH | 2 | 3 | |
| | Total | 11 | 57 | |

FIG. 6A

| Campus | Department | Category | Scheduled Sections | Teacher Sections | Section Difference | Staffing Analysis (FTEs) |
|---|---|---|---|---|---|---|
| 9TH GR CENTER | CTE | AUDIO AND VIDEO PRODUCTION | 2 | 8 | 6 | 0.0 |
| 9TH GR CENTER | CTE | BUSINESS | 27 | 16 | 11 | |
| HAMILTON HS | CTE | CULINARY ARTS | 4 | 8 | 4 | 1.0 |
| HAMILTON HS | CTE | CONSTRUCTION TECHNOLOGY | 14 | 23 | 9 | 1.0 |
| HAMILTON HS | CTE | HEALTH SCIENCE | 15 | 36 | 21 | 3.0 |
| HAMILTON HS | CTE | PROF COMMUNICATIONS | 12 | 8 | 4 | 0.0 |
| 9TH GR CENTER | CTE | PROF COMMUNICATIONS | 5 | 8 | 3 | |
| HAMILTON HS | CTE | PUBLIC SAFETY | 20 | 18 | 2 | 0.0 |
| 9TH GR CENTER | CTE | PUBLIC SAFETY | 6 | 8 | 2 | |
| 9TH GR CENTER | CTE | WELDING | 6 | 8 | 2 | 0.5 |
| SECONDARY | CTE | TOTAL | 243 | 287 | 44 | 5.5 |
| | | | | | | |
| HAMILTON HS | ELECTIVES | SPORTS MEDICINE | 1 | 6 | 5 | |
| SECONDARY | ELECTIVES | TOTAL | 1 | 6 | 5 | 0.5 |
| | | | | | | |
| HAMILTON HS | ENGLISH LANGUAGE ARTS | HS ENGLISH | 85 | 92 | 7 | 1.0 |
| 9TH GR CENTER | ENGLISH LANGUAGE ARTS | HS ENGLISH | 32 | 44 | 12 | 3.0 |
| 9TH GR CENTER | ENGLISH LANGUAGE ARTS | HS READING | 1 | 13 | 12 | |
| SECONDARY | ENGLISH LANGUAGE ARTS | TOTAL | 123.5 | 161 | 38 | 4.0 |
| | | | | | | |
| SECONDARY | ESL | TOTAL | 0 | 10 | NA | 0.0 |
| | | | | | | |
| 9TH GR CENTER | FINE ARTS | ART | 16 | 8 | 8 | 1.0 |
| SECONDARY | FINE ARTS | TOTAL | 82 | 70 | 12 | 1.0 |
| | | | | | | |
| HAMILTON HS | FOREIGN LANGUAGE | SPANISH | 38 | 31 | 7 | 1.0 |
| 9TH GR CENTER | FOREIGN LANGUAGE | SPANISH | 27 | 24 | 3 | 0.5 |
| SECONDARY | FOREIGN LANGUAGE | TOTAL | 65 | 55 | 10 | 1.5 |

FIG. 6B

| Campus | Department | Category | Scheduled Sections | Teacher Sections | Section Difference | Staffing Analysis (FTEs) |
|---|---|---|---|---|---|---|
| HAMILTON HS | MATHEMATICS | HS MATH | 88 | 105 | 17 | 2.0 |
| 9TH GR CENTER | MATHEMATICS | HS MATH | 35 | 45 | 10 | 1.0 |
| SECONDARY | MATHEMATICS | TOTAL | 125 | 153 | 28 | 3.0 |
| HAMILTON HS | PHYSICAL ED/HEALTH | HEALTH | 0.5 | 6 | 6 | 1.0 |
| HAMILTON HS | PHYSICAL ED/HEALTH | PE GIRLS | 4 | 13 | 9 | 1.0 |
| SECONDARY | PHYSICAL ED/HEALTH | TOTAL | 81.5 | 103 | 22 | 2.0 |
| HAMILTON HS | SCIENCE | LIFE SCIENCE | 18 | 32 | 14 | 2.0 |
| 9TH GR CENTER | SCIENCE | LIFE SCIENCE | 34 | 40 | 6 | 1.0 |
| SECONDARY | SCIENCE | TOTAL | 134 | 161 | 27 | 3.0 |
| HAMILTON HS | SOCIAL STUDIES | COMPASS SOC STUDIES | 1 | 0 | 1 | |
| HAMILTON HS | SOCIAL STUDIES | ECONOMICS | 13 | 11 | 2 | |
| HAMILTON HS | SOCIAL STUDIES | GOVERNMENT | 12.5 | 10 | 3 | 1.0 |
| HAMILTON HS | SOCIAL STUDIES | HISTORY | 63 | 62 | 1 | |
| 9TH GR CENTER | SOCIAL STUDIES | GEOGRAPHY | 32 | 38 | 6 | 1.0 |
| SECONDARY | SOCIAL STUDIES | TOTAL | 32 | 38 | 6 | 0.0 |
| HAMILTON HS | SPECIAL ASSIGNMENT | ATHLETIC COORDINATOR | 0 | 14 | 14 | 1.0 |
| HAMILTON HS | SPECIAL ASSIGNMENT | ISS | 0 | 10 | 10 | 1.0 |
| SECONDARY | SPECIAL ASSIGNMENT | TOTAL | 0 | 45 | 45 | 2.0 |
| SECONDARY | SPECIAL EDUCATION | TOTAL | 11 | 121 | 110 | 0.0 |
| SECONDARY | | FTEs NET TOTAL | | | | 17.5 |

SYSTEM, APPARATUS, AND METHOD FOR GENERATING SECONDARY STAFFING SCHEDULES

TECHNICAL FIELD

This disclosure relates to staffing schedules and, more specifically, creating an optimal schedule for sharing staffing across secondary education facilities based on a plurality of inputs.

BACKGROUND

School districts are required to maintain a certain student to staff ratio, provide certain required courses, while remaining within budgets for their district. In some districts teachers and students may move between campuses during the day for classes offered at a different campus than their home campus. In some districts, there is a facility that all campuses share for certain classes. Determining staffing for the courses at the shared facility and also at each individual campus can be challenging for districts as enrollment fluctuates and students' course needs and wants fluctuate as well. What is needed is a system for determining staffing requirements for secondary education campuses.

SUMMARY

In one aspect, the disclosure provides a staff scheduler for generating staffing schedules for secondary education campuses in a school district. In one embodiment the staff scheduler includes: at least one interface for receiving a plurality of inputs from at least one external computing device; and a processor configured to perform a staff scheduling algorithm to generate a staffing schedule report for the secondary education campuses, wherein the staff scheduling algorithm generates a series of input prompts and decisions based on the plurality of inputs. The plurality of inputs includes at least courses requested by students at each campus, current teachers available in the district, current teachers' qualifications, campus facility information, which courses may be shared at multiple campuses, and which staff may be shared by multiple campuses.

In another aspect, the disclosure provides a staff scheduling system for secondary campuses for a school district. In one embodiment, the staff scheduling system includes: a staff scheduler configured to generate a staff schedule report; and at least one external computing device configured to supply course and teacher data to the staff scheduler for the staff schedule report. The staff scheduler includes: at least one interface for receiving a plurality of inputs from the at least one external computing device; a memory, the memory storing a staff scheduling computer program product; and a processor configured to execute a staff scheduling algorithm and prepare based thereon a staffing schedule for the secondary campuses in the school district, wherein the staff scheduling algorithm generates a series of input prompts and decisions based on the plurality of inputs; wherein the plurality of inputs includes at least courses requested by students at each campus, current teachers available in the district, current teachers' qualifications, campus facility information, which courses may be shared at multiple campuses, and which staff may be shared by multiple campuses.

In yet another aspect, the disclosure provides a method for preparing a staffing schedule report for secondary education campuses of a school district. In one embodiment, the method includes: receiving data for the secondary campuses of the school district from at least one external source, the data including at least courses requested by students at each campus, current teachers available in the district, current teachers' qualifications, campus facility information, which courses may be shared at multiple campuses, and which staff may be shared by multiple campuses; and preparing a staffing schedule report for the secondary education campuses in the school district using the received data; wherein preparing the staffing schedule is performed by a processor.

BRIEF DESCRIPTION

Reference is now made to the following descriptions taken in conjunction with the accompanying drawings, in which.

DETAILED DESCRIPTION

Each school district must determine staffing needs each year as enrollment fluctuates and student course choices fluctuate. Certain courses and subjects are required for each student, and in addition to required courses, students may select elective classes. School districts that have multiple campuses may need to determine a configuration of staff and courses which maximize and make efficient use of district resources. The configuration may include how many sections are needed to accommodate students across all campuses and how many teachers are needed to staff the sections. Further, multiple campuses may need to share courses and staffing for certain courses.

Accordingly, the disclosure provides a computer-based staff scheduling system for providing a staffing schedule report for each district based on the inputs received. The inputs may come from, for example, at least one user at each campus and/or a district administrator, data received from a school district management system, and data from external sources. The inputs considered in generating a staffing schedule report include at least courses requested by students, course resource needs, campus facilities and resources available, a target student to teacher ratio, and other factors which can be, should be, or even must be considered for each staffing schedule for each district.

A staff scheduling system according to the disclosure may include a computer program product configured to prepare a staffing schedule according to details of the disclosure. A staff scheduler apparatus and method for conducting staffing are also provided. The staff scheduling system may include at least one user interface where one or more users can input various inputs to be considered in the preparation of a staffing schedule. The inputs may include inputs from a user at each campus and or a district administrator.

The staff scheduling system may also include external data sources. A data management system at a school district level may be connected with the staff scheduler to provide data via automated inputs and updates. The data which may be automatically updated may include student data students enrolled and their individual identification data; students course requests; teacher data; teacher qualifications which courses each teacher is qualified to teach; and other information pertinent to staff schedules.

The disclosure advantageously improves the computer technology area of staff scheduling by allowing a computer to perform a function previously not performable by a computer: generate a staffing schedule by considering and weighing the plurality of inputs as disclosed herein. As provided below, the disclosure provides specific implementations for generating staff schedules.

Figure 1:
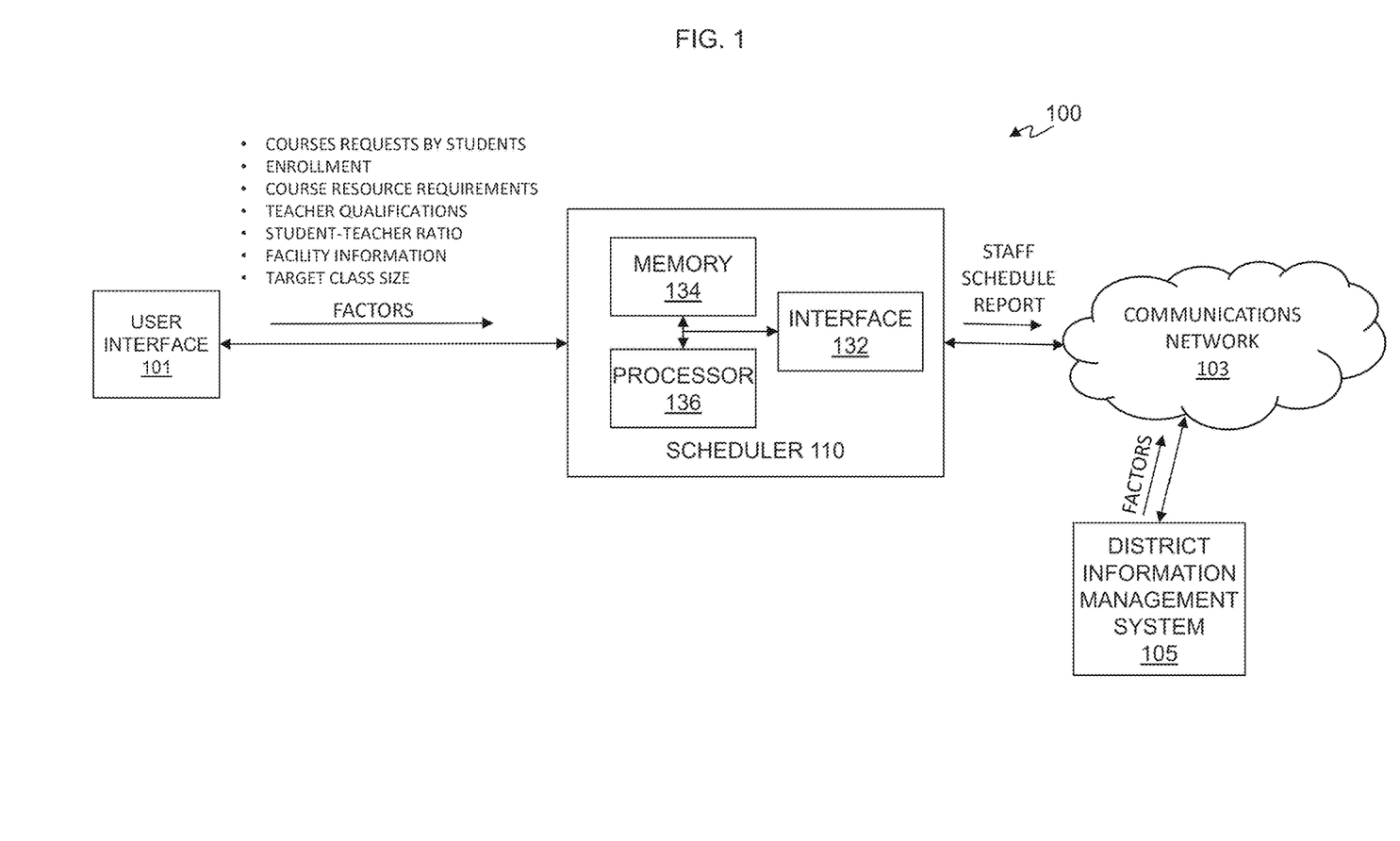
FIG. 1 illustrates a diagram of an embodiment of a staff scheduling system for creating a staffing schedule report for secondary school campuses for a school district carried out according to the principles of the disclosure.

Turning now to the figures, FIG. 1 illustrates a diagram of an embodiment of a staff scheduling system 100 constructed according to the principles of the disclosure. The staff scheduling system 100 is configured to allow at least one user, such as a scheduling coordinator or other administrative/data entry personnel to input a plurality of factors that impact the staffing schedule for a school district and secondary campuses of the school district. The staff scheduling system 100 includes a staff scheduler 110 connected with at least one user interface 101 for entering a plurality of scheduling factors into the staff scheduler 110. The system 100 may also include a communications interface 132 for connecting the staff scheduler 110 with a district information management system 105 or other external computing sources, which may provide scheduling factors and updates, in some embodiments automatically, to the staff scheduler 110. Thus, the staff scheduler 110 can receive scheduling factors from both the user interface 101 and the district information management system 105. The district information management system 105 is connected to the staff scheduler 110 via a communications network 103, such as the internet. The user interface 101 can also be connected to the staff scheduler 110 via the communications network.

The user interface 101 is configured to receive a plurality of data and information which are considered when determining a staffing schedule. The user interface 101 may include one or more computer devices configured to communicate with the staff scheduler 110. The user interface 101 may be a conventional communication device such as a smart phone, a tablet, a pad, a laptop, a desktop, or another device capable of interfacing with a user and communicating via wireless connections, wired connections or a combination thereof. The user interface 101 may also be a web-based interface provided by the state or individual school district which may then be accessed at each staffing campus. After scheduling factor data is entered by the user(s), the user interface 101 thereafter communicates the data to the staff scheduler 110 for consideration in the production of the staffing schedule.

The staff scheduler 110 may be a separate computing device apart from the user interface 101, or in some embodiments may be incorporated into the same computing device or computing system as the user interface 101. In some embodiments, the staff scheduler 110 may be housed on a network at either the campus, district, or state level. In one embodiment, the staff scheduler 110 is implemented on a server that includes the necessary logic and memory to perform the functions disclosed herein. Accordingly, the staff scheduler 110 can also be a website hosted on a web server, or servers, and that is accessible via the World Wide Web. A Uniform Resource Locator (URL) can be used to access the various webpages of the staff scheduler 110. In some embodiments, the staff scheduler 110 can be implemented as a Software as a Service (SaaS).

The staff scheduler 110 may include at least one interface, for example the communications interface 132, a memory 134 and a processor 136. The communications interface 132 is a component or device interface configured to couple the staff scheduler 110 to the user interface 101 and communicate therewith. The communications interface 132 may also be configured to connect the staff scheduler 110 with the district information management system 105 and any other external data sources, or in some embodiments, a second interface may be required. The communications interface 132 can be a conventional interface that communicates with the user interface 101 and district information management system 105 according to standard protocols. The communications network 103 can be a conventional communications network that also communicates via standard protocols.

The memory 134 is configured to store a series of operating instructions that direct the operation of the processor 136 when initiated, including the code representing the algorithms for staff scheduling. The memory 134 is a non-transitory computer readable medium. The memory 134 can be the memory of a server.

The processor 136 is configured to direct the operation of the staff scheduler 110. As such, the processor 136 includes the necessary logic to communicate with the interface 132 and the memory 134 and perform the functions described herein to prepare a staffing schedule report based on the plurality of inputs received by the staff scheduler 110. The processor 136 can be part of a server. The staffing schedule report can be communicated to the district information management system 105. In some embodiments, the staffing schedule report can be communicated to the user interface 101.

Figure 2:
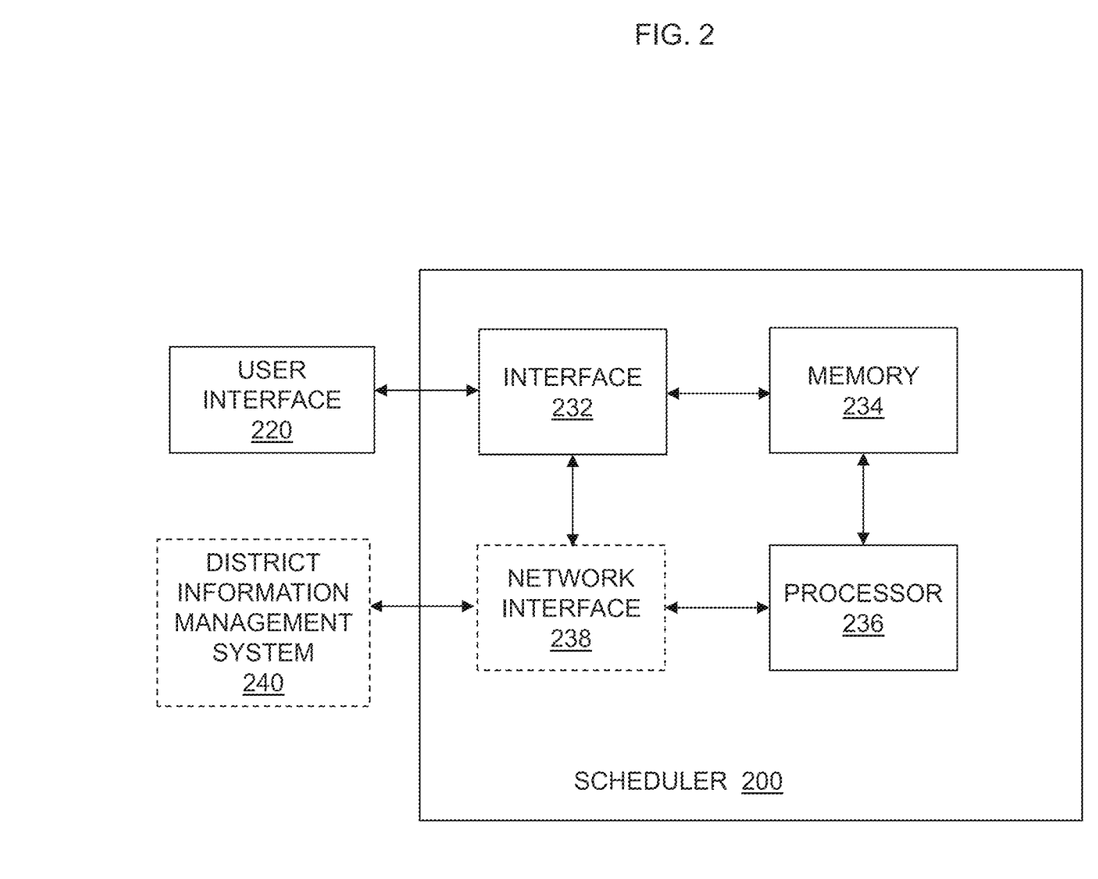
FIG. 2 illustrates a block diagram of one embodiment of a staff scheduler constructed according to the principles of the disclosure.

FIG. 2 illustrates a block diagram of an embodiment of a staff scheduler 200 constructed according to the principles of the disclosure. The staff scheduler 200 or at least a portion thereof can be embodied as a series of operating instructions stored on a non-transitory computer-readable medium that direct the operation of a processor when initiated. The staff scheduler 200 can be stored on a single computer or on multiple computers. The various components of the staff scheduler 200 can communicate via wireless or wired conventional connections. A portion of the staff scheduler 200 can be located on a server and other portions of the staff scheduler 200 can be located on a computing device or devices that are connected to the server via a network or networks.

The staff scheduler 200 can be configured to perform the various functions disclosed herein including receiving inputs from a user interface, from a district information management system, and inputs which may be stored in a memory, and can consider all of the received inputs in order to prepare a staffing schedule report by course for secondary campuses in each district, including courses and staffing which will be shared by multiple campuses in the district. In some embodiments, the staffing schedule report can be for all of the school campuses. The detailed schedule report may provide at least a number of scheduled course sections, a number of teacher sections by course, and an analysis regarding whether the course is under or over staffed. In some embodiments, the courses may be grouped by department, and in yet other embodiments, the courses may be grouped by category.

In one embodiment, at least a portion of the staff scheduler 200 is a computer program product. The staff scheduler 200 includes staff scheduling code, a memory, and may include a network interface. The staff scheduler 200 is also communicatively coupled to at least one user interface 220.

The at least one user interface 220 is configured to receive inputs from one or more users at one or more secondary campuses or one or more district administrators. The at least one user interface 220 or at least a portion thereof can be provided on a display or screen of user devices to allow interaction between users and the staff scheduler 200. In one embodiment, the at least one user interface 220 includes a web page provided on a user device. The interaction via the user interface 220 includes manual entry of certain data points. A keyboard, keypad, mouse, or other input device can be used for entering the data points.

Some data points may stay substantially constant, such as district information, campus information, and campus room information and facility layout, course requirements, such as grade level, age, sex, or prerequisites, and as such, may not require a substantial amount of data entry beyond an initial setup, except as required for updates and the like. Other data points may not be constant, such as student information, including grade level, demographics, special accommodations required, if any; which courses have been requested by students and how many students have requested each course by campus; courses currently offered at each campus; teacher information, including teacher data, courses and subjects qualified to teach, certifications; current staffing levels; and course enrollment requirements, including minimum class size, maximum class size, and a target average class size; and various other additional inputs which may require more substantial data entry, either into the at least one user interface, or into a school district information management system.

The interface 232, a communications interface, is a component or device interface configured to couple the staff scheduler 200 to the at least one user interface 220 and communicate therewith. The interface 232 may also be configured to connect the staff scheduler 200 with a district information management system 240, or in some embodiments, a second interface, such as network interface 238 may be included. The interface 232 and second interface 238 may each be a conventional interface that communicates with the user interface 220 and district information management system 240 according to standard protocols.

The memory 234 is configured to store a series of operating instructions that direct the operation of the processor 236 when initiated, including the code representing the algorithms for staff scheduling. The memory 234 is a non-transitory computer readable medium. The memory 234 can be the memory of a server.

The processor 236 is configured to direct the operation of the staff scheduler 200. As such, the processor 236 includes the necessary logic to communicate with the interface 232, second interface 238, and the memory 234 and perform the functions described herein to prepare a staffing schedule report based on the plurality of inputs received by the staff scheduler 200. The processor 236 can be part of a server.

Figure 3:
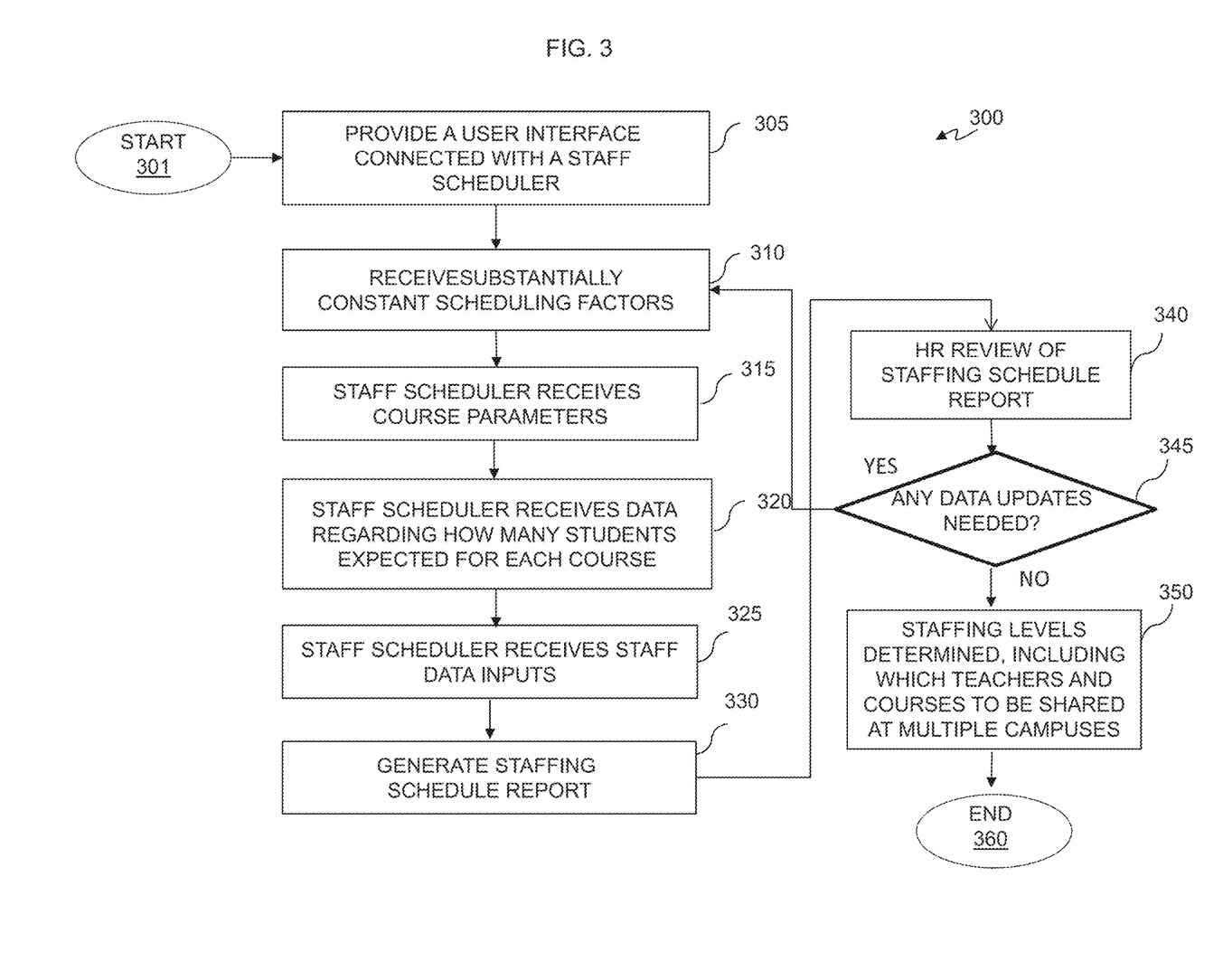
FIG. 3 illustrates a flow diagram of an embodiment of a method for creating a staffing schedule report carried out according to the principles of the disclosure.

Turning now to FIG. 3, there is illustrated a flow diagram of an embodiment of a method 300 for preparing a staffing schedule report according to aspects of the disclosure. In one embodiment, at least a portion of the method 300 can be performed by a computing device or processor as disclosed herein. A computing device may include the necessary logic circuitry to carry out at least a portion of the method 300. In one embodiment, the method 300 or at least a portion thereof may be embodied as a series of operating instructions that are stored on a non-transitory computer readable medium and used to direct the operation of a processor when initiated thereby. As indicated below, a staff scheduler as disclosed herein can perform at least some of the steps of the method 300. The method 300 begins in a step 301.

In a step 305, at least one user interface is provided to at least one user at a secondary campus or and/or school district responsible for course scheduling and staff scheduling at one or secondary campuses and/or a district administrative office. The at least one user interface is connected with a staff scheduler, such as staff scheduler 200 described herein.

In a step 310, the staff scheduler receives scheduling factors for the one or more secondary campuses that are substantially constant, not subject to frequent change. The staff scheduler receives the scheduling factors, in one embodiment, from a school district information management system. Other embodiments may include the staff scheduler receiving the scheduling factors from at least one user interface connected with the staff scheduler. The substantially constant scheduling factors may include, but are not limited to the following: facility information for each secondary campus, including list of classrooms, classroom size, room amenities, including computers, and layout; resource information such as, for example, lab equipment, music equipment, etc.; state required student to teacher ratios for each course; any union or other legal contract restrictions; course restrictions, such as grade, gender, maximum class size, etc.; and other factors which may vary by campus and district.

In a step 315, the staff scheduler receives course parameters from the at least one user. The course parameters may include, current courses currently offered; for each course, a number of students for each campus that have requested the course; course facility and amenity requirements—do any of the courses share a room or other facility resource with another course; and which campus or campuses offer which courses whether the courses or combined courses offered at one or more campuses, or only at certain campuses; and current staffing information, such as which teachers are qualified or certified to teach which courses. In one embodiment, the staff scheduler may be configured to aggregate the foregoing data and consider all courses across all campuses. In some embodiments, the staff scheduler may have a memory with certain staffing parameters pre-loaded or entered, such that a user at each campus need not enter certain staffing parameter data. In some embodiments, the staff scheduler may receive some or all course parameters via an upload, in some embodiments, from the at least one user interface and/or a district information management system.

In a step 320, the staff scheduler receives information regarding how many students are expected for the courses offered, as discussed in Step 310. The staff scheduler considers whether any of the courses have a maximum number of students that the course can accommodate.

In a step 325, the staff scheduler also receives staffing data inputs. The staffing data inputs may be received from the at least one user interface and/or the school district management system. The staffing data inputs may include at least the following: current staffing levels for each campus; current staff assignments by course for each campus; current staff schedule report requirements such as conference time, required free time, other job responsibilities that may require portions of each teacher's day; current certifications for each teacher and which courses they have stronger background and qualifications to teach; whether or not a teacher is able to be shared between multiple campuses—for example, geographic distance between campuses and/or physical limitations may limit whether any teachers, if any, may be able to teach at multiple campuses. In some embodiments, the staff scheduler may be configured to receive updates from the district student management system on a regular periodic basis. In some embodiments, the district information management system may be configured to receive updates from at least one user interface and automatically provide updates to the staff scheduler when inputs are received. In other embodiments, the user may be able to manually request an update.

In one embodiment, the method 300 includes considering legal restrictions which may impact course and staff sharing between multiple campuses. The legal restrictions may include at least certain teacher constraints such as maximum teaching time each teacher is available, travel time between the multiple campuses and teacher compensation therefor, and any union constraints, such as negotiated off time, restrictions on class size, number of classes, etc.

In one embodiment, a training module can be provided, whereby teachers may attend a virtual training session via a computing device, and upon completion of the virtual training session, complete and sign a digital oath. The staff scheduler may provide the training module. In one embodiment, the training module may include state required training for both teachers and schedulers. In another embodiment, the staff scheduler may include an option whereby the user may modify the training module, or upload or otherwise provide a customized training module, specific to the user's campus or school district. The method 300 can consider the training results, such as the digital oath, as part of the staff data inputs.

In a step 330, a staffing schedule report is generated based on the inputs from the user, uploads, and school district information management system. In some embodiments, all of the inputs are considered for generating the staffing schedule report. Part of the generating includes organizing the inputs and processing the data to prepare a schedule. These can be performed by the staff scheduler. In some embodiments, the organizing of the inputs may include aggregating the course parameters and staff data inputs to consider all courses offered across all campuses, a target average class size, and a maximum possible class size. In other embodiments, the organizing may include determining which courses will be taught at each campus and which courses will be shared by multiple campuses. In other embodiments, the organizing may include which teachers will teach each course at which campus, including which teachers may be teaching one or more courses at multiple campuses. In other embodiments, the organizing may include verifying all the state requirements related to student-teacher ratio are met, teacher off-time, and other legal considerations are met.

The schedule report includes at least a number of sections for each course by campus, a number of teacher sections for each course for each campus, and an analysis by course indicating whether the courses is under or overstaffed, if the teacher course section and course sections do not match. In one embodiment, a staffing schedule report is generated by executing a decision tree algorithm that generates the staff schedule employing, for example, the staff factors, staffing parameters, and data received in steps 310 to 325.

In a step 340, a review of the staffing schedule report from a human resource perspective is performed. The human resource review may be by a school district human resources team to determine what staff additions or reductions may be necessary based on the current enrollment and projected enrollment for the district and for each secondary campus. In a step 345, a determination is made if any staffing changes are needed or have occurred since the data was provided in steps 310 through 325, the human resources review may result in receiving additional data and the method may go back to step 310 for entering the additional data via manual input into at least one user interface for the staff scheduler to reconsider the schedule report. The additional data may include new teacher qualifications, staffing changes—additions or reductions, and any facility or campus updates. After step 340, the method 300 continues to step 350, wherein the staffing levels are determined for each secondary campus, including which courses and teachers may be shared across multiple campuses. The method ends at step 360.

Figure 4:
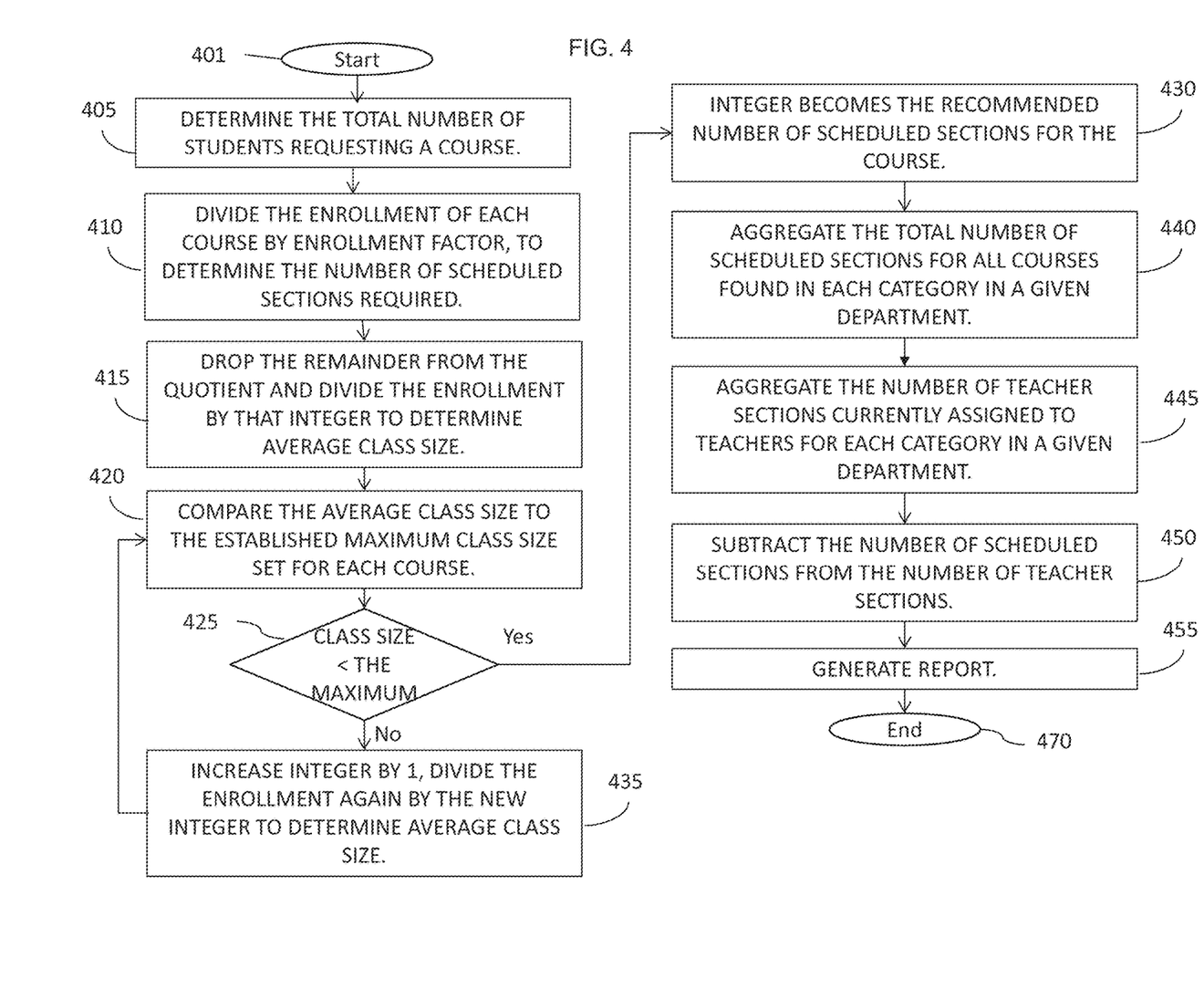
FIG. 4 illustrates a flow diagram of an example of a method corresponding to a staff scheduling algorithm executed according to the principles of the disclosure.

FIG. 4 illustrates a flow diagram of an example of a method 400 to complete a portion of the steps of the staff scheduling method 300 illustrated in FIG. 3. The method 400 corresponds to an algorithm that can be executed by a processor, such as processor 236. The method 400 can vary depending on various inputs received according to the corresponding algorithm. A staff scheduler as disclosed herein can execute the algorithm to perform the method 400. The algorithm can be a decision tree algorithm that when executed generates prompts and questions based on received inputs to generate a staffing schedule report. The method 400 provides an example of one of many algorithms that can be employed for staff scheduling as disclosed herein. The method 400 illustrates questions, answers, and user prompts which may occur between steps 310 and 325 of the method as illustrated in FIG. 3 to execute a staffing schedule report.

The algorithm starts in a step 401. In a step 405, the staff scheduler determines the total number of students requesting any course either individually scheduled on campus, scheduled along with another course with the same teacher at the same time on campus, or on a shared campus.

In a step 410, the staff scheduler divides the enrollment of each course by an enrollment factor, wherein the enrollment factor is the target student-teacher ratio, per district parameters to determine the number of scheduled sections required. In a step 415, the staff scheduler drops the remainder from the quotient and divides the enrollment by that integer to determine average class size.

In a step 420, the staff scheduler compares the average class size to an established maximum class size set for each course. In a steo 425, a determination is made if the average class size is less than the maximum allowed, in a step 430, the staff scheduler assigns a recommended number of sections by assigned the integer as the recommended number of scheduled sections for the course. If average class size exceeds the established maximum class size, in a step 435, the staff scheduler increases the integer by 1, and divides the enrollment again by the new integer to determine average class size, and compare against maximum class size. This process is repeated until parameters for max class size are met.

In a step 440, the staff scheduler aggregates the total number of scheduled sections for courses, such as all courses, found in each category in a given department. In a step 445, the staff scheduler aggregates the number of teacher sections currently assigned to teachers for each category in a given department. In a step 450, the staff scheduler subtracts the number of scheduled sections from the number of teacher sections. In a step 455, the staff scheduler generates a report such as follows: difference between scheduled sections and teacher sections≥3 as over staffed, difference between scheduled sections and teacher sections ≤−3 as understaffed, and differences scheduled sections and teacher sections >−2 but <+2 as efficiently staffed. Note that the +/− and < and >numbers (3 and 2) provided are examples of variables, and these variables may be changed or updated by the user. The algorithm ends at a step 470.

Figure 5A:
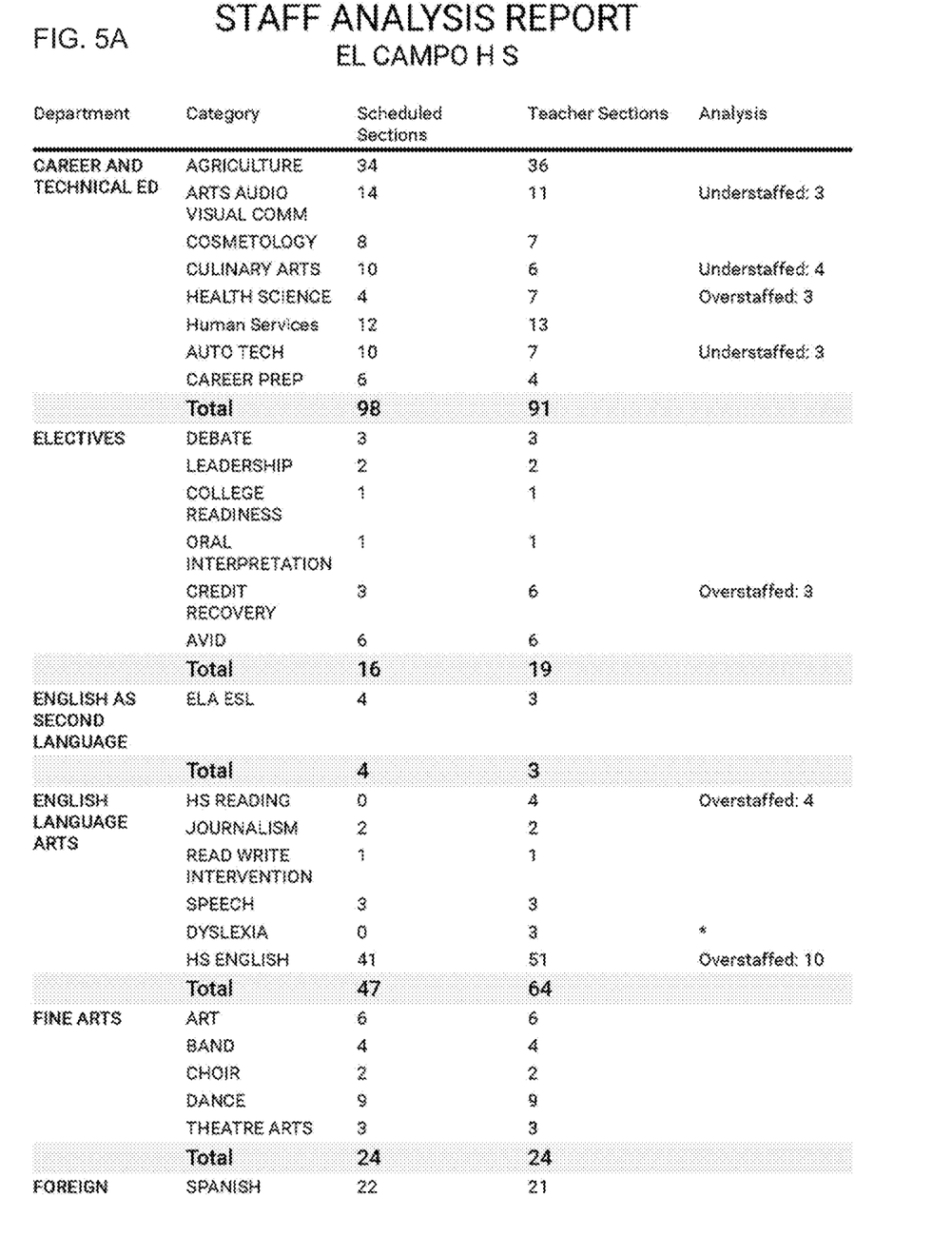
FIG. 5A illustrates a first page and FIG. 5B illustrates a second page of an example of a staff schedule report which may be generated by the staff scheduler according to principles of the disclosure.
Figure 5B:
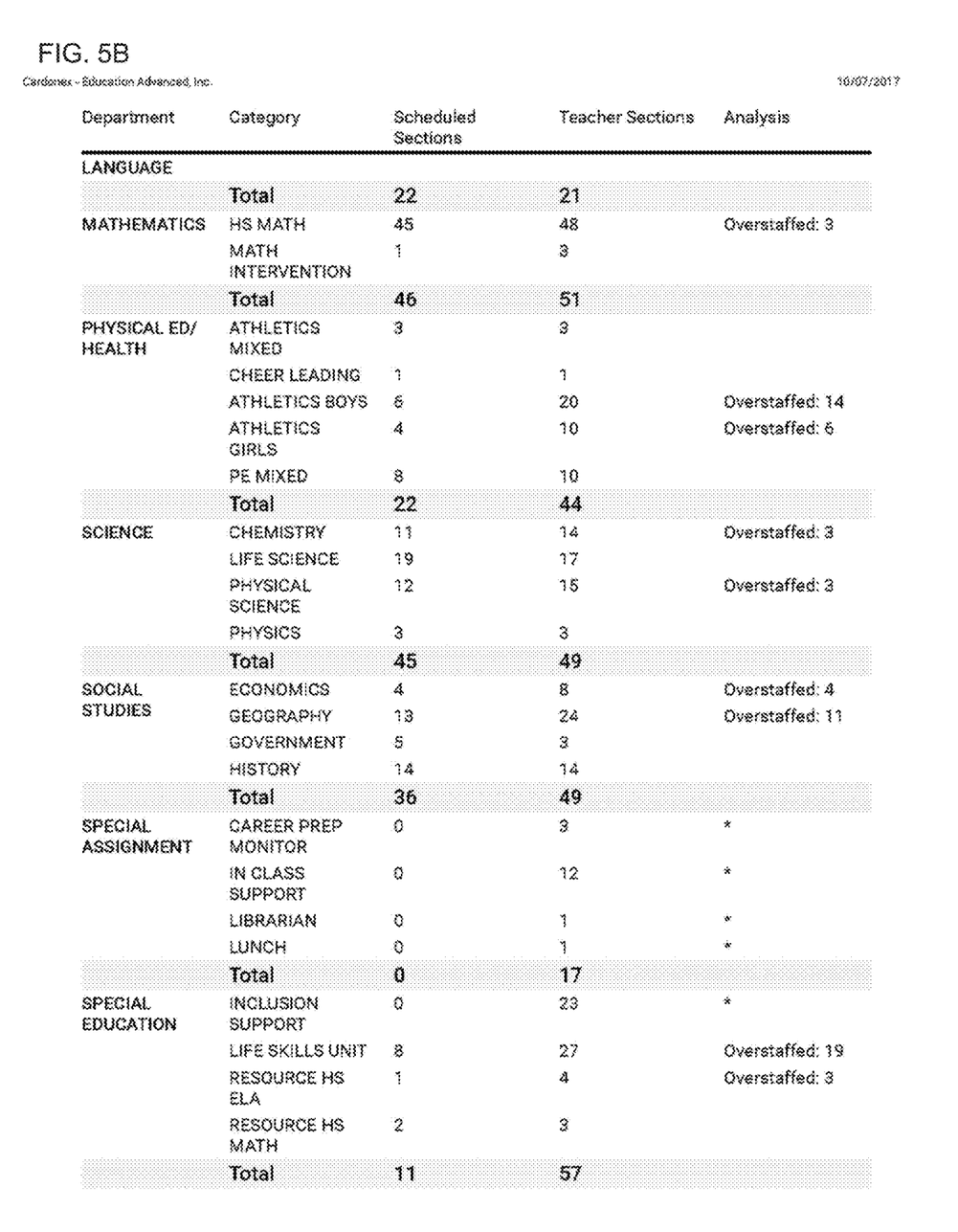

FIGS. 5A and 5B illustrate pages of an example of a staffing schedule report generated by a staff scheduler carried out according to aspects of the disclosure. FIG. 5A is a first page of the report and FIG. 5B is a second page. In the staff schedule report, scheduled sections represent the number of sections students have signed up for an upcoming year. The teacher sections are how many sections teachers are currently teaching, and the analysis shows how many sections (not number of teachers) they are over-staffed or under-staffed. In general, a full-time teacher may teach between 5 to 7 sections.

Figure 6A:
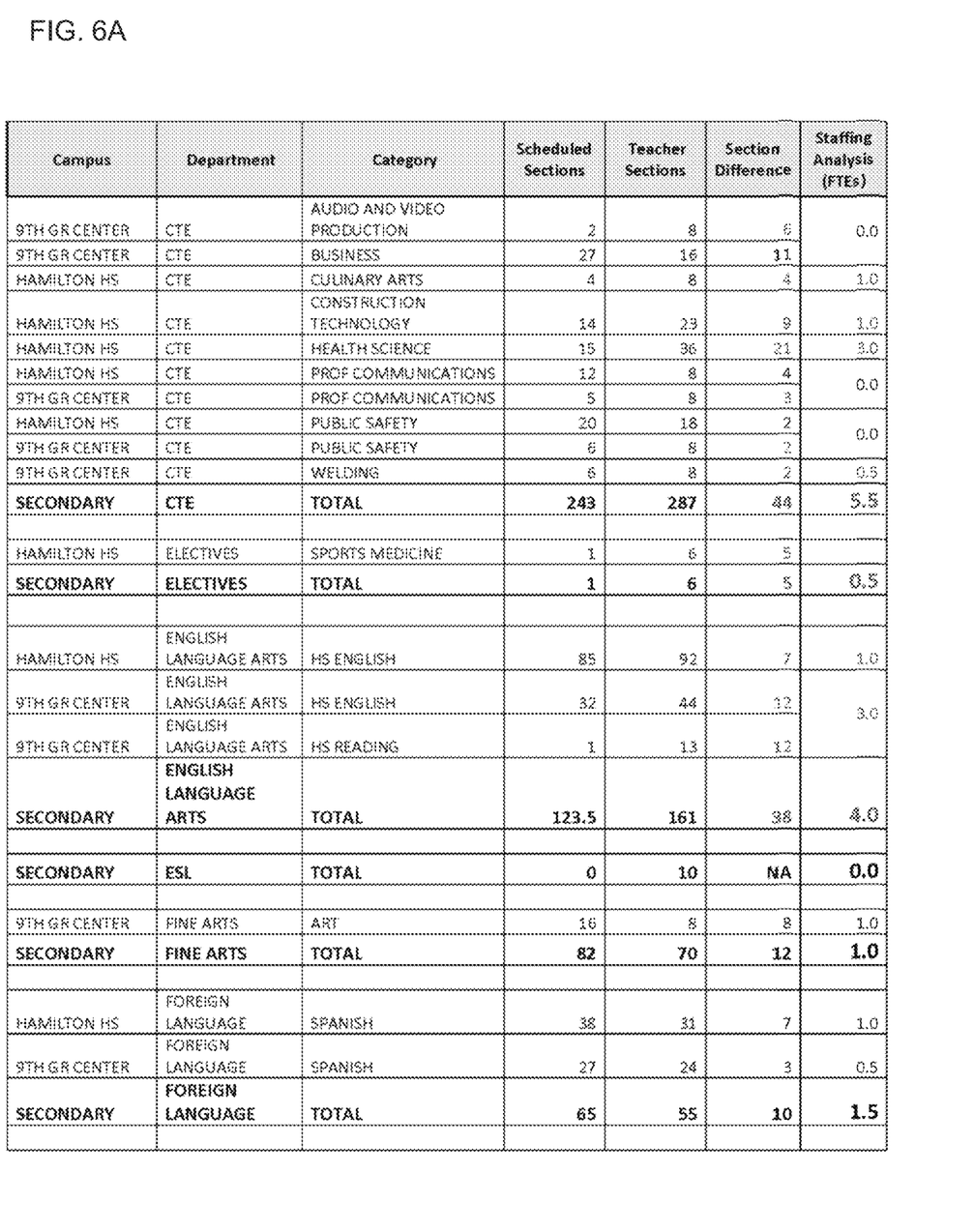
FIG. 6A illustrates a first page and 6B illustrates a second page of an example of a staff schedule report showing analysis for multiple campuses which may be generated by the staff scheduler according to the principles of the disclosure.
Figure 6B:
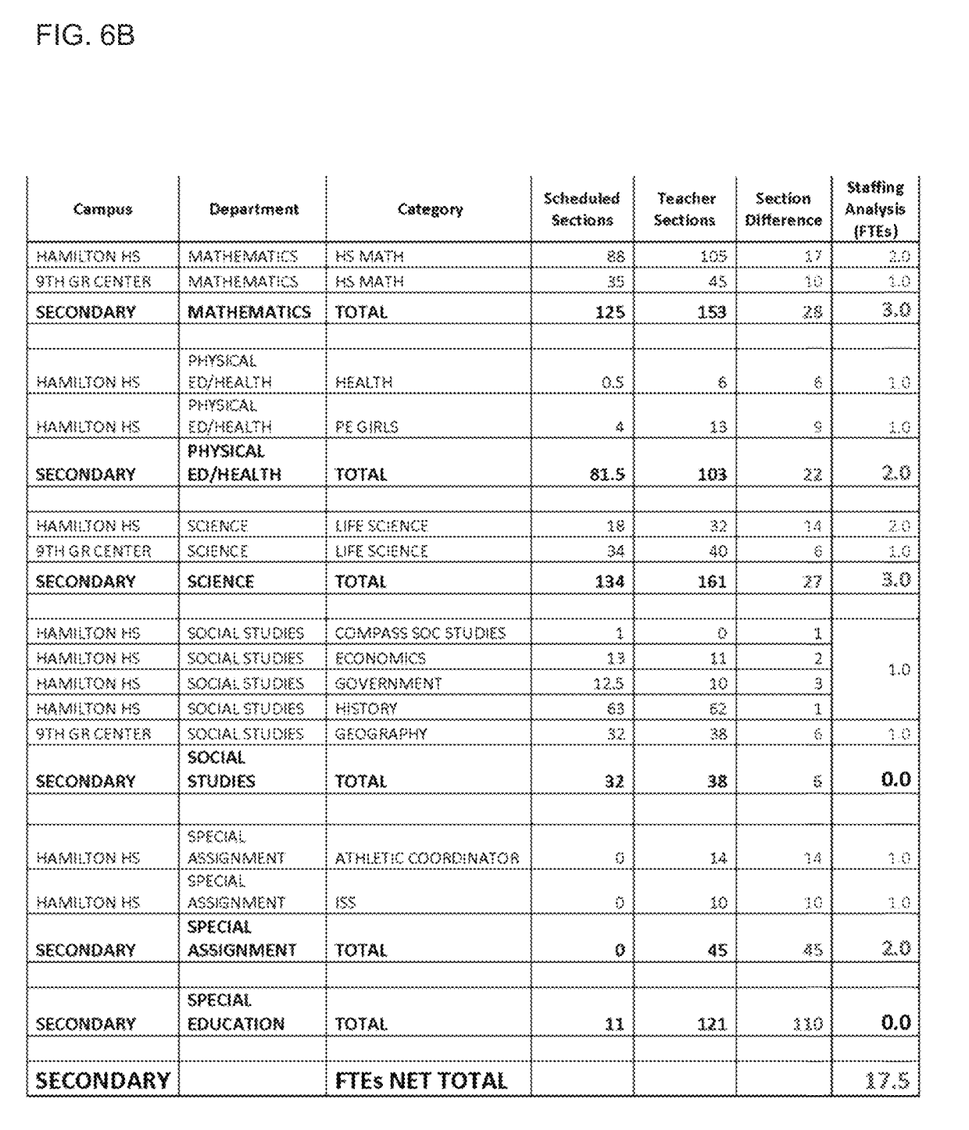

FIGS. 6A and 6B illustrates another example of pages of a staffing schedule report generated by a staff scheduler carried out according to aspects of the disclosure. FIG. 6A is a first page of the report and FIG. 6B is a second page. The schedule report a represents a combined report with side-by-side comparisons of each secondary campus in the school district to show overall staffing, over-staffing, or under-staffing.

A portion of the above-described apparatus, systems or methods may be embodied in or performed by various, such as conventional, digital data processors or computers, wherein the computers are programmed or store executable programs of sequences of software instructions to perform one or more of the steps of the methods. The software instructions of such programs or code may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

The invention claimed is:

1. A staff scheduler for generating staffing schedules for secondary education campuses in a school district, comprising:

at least one interface for receiving a plurality of inputs from multiple external computing devices, wherein at least a portion of the inputs are automatically received from a school district information management system on a regular periodic basis; and a processor configured to periodically perform a staff scheduling algorithm to generate a staffing schedule report for each of the secondary education campuses, wherein the staff scheduling algorithm generates a series of input prompts and decisions based on the plurality of inputs, wherein at least one legal restriction is also periodically evaluated and employed by the processor to determine teaching staffing to be shared by multiple campuses, wherein said periodically evaluated is at regular and frequent intervals of time;

wherein said at least one legal restriction includes at least one of:
 a maximum teaching time each teacher is available,
 a travel time between the multiple campuses and teacher compensation therefor for each teacher, and
 a union constraint, wherein the plurality of inputs includes at least courses requested by students at each campus, current teachers available in the district, current teachers' qualifications, campus facility information, which courses may be shared at multiple campuses, and which staff may be shared by multiple campuses;

wherein the staff scheduling algorithm employs the plurality of inputs, including the inputs that are automatically received, and includes at least the steps of:
 determining the total number of students requesting any course, wherein the total number of students is the number of students requesting said course on said multiple campuses;
 dividing an enrollment of each course by an enrollment factor to determine a quotient having an integer and remainder;
 dropping the remainder from the quotient, and dividing the enrollment by the integer of the quotient to determine an average class size;
 comparing the average class size with a maximum class size;
 if the average class size exceeds the maximum class size, increasing the integer by one and re-dividing the enrollment by the integer;
 aggregating a total number of scheduled sections for each course and aggregating a number of teachers currently assigned for each course category in a department to determine a number of teacher sections for each said course category;
 providing an analysis of course categories that are under or over staffed by subtracting the total number of scheduled sections from the number of teacher sections; and
 periodically generating the staffing schedule report as a visual display for each of the secondary education campuses, wherein the visual display presents a column, based on the analysis, denoting course categories of departments that are understaffed, overstaffed, or no indication of a understaffed/overstaffed condition, wherein said staffing schedule report is employed to periodically update teacher staffing schedules—that are employed for staffing of teachers for each secondary education campus to satisfy the at least one legal restriction and the plurality of inputs, wherein the visual display is presented as a matrix of rows, and columns for the departments, the course categories, the scheduled sections, the teacher sections and the analysis, wherein, for each of the departments, the rows include a highlighted total row with bolded font that has a count of the scheduled sections and the teacher sections, wherein the analysis for each of the course categories includes an indication of the overstaffed and a count of overstaffing if overstaffing has occurred.

2. The staff scheduler according to claim 1, wherein the multiple external computing devices include at least one user interface that receives data from a user in the school district, wherein the at least one user interface is presented as a web page.

3. The staff scheduler according to claim 1, wherein the staffing schedule report includes at least a number of scheduled course sections, a number of teacher sections by course, and an analysis regarding whether each course is under staffed, over staffed, or has a correct amount of staff.

4. The staff scheduler according to claim 3, wherein the courses are grouped by department.

5. The staff scheduler according to claim 3, wherein the courses are grouped by category.

6. The staff scheduler according to claim 1, wherein the facility information includes at least a list of classrooms; classroom size; room amenities, including computers, and layout; equipment resource information.

7. The staff scheduler according to claim 1, wherein the plurality of inputs further includes state required student to teacher ratios for each course; union restrictions; and course restrictions, including grade requirements, gender restrictions, and maximum class size.

8. A staff scheduling system for generating staffing schedules for secondary campuses for a school district, comprising:

a staff scheduler configured to generate a staff schedule report; and at least one external computing device configured to supply course and teacher data to the staff scheduler for the staff schedule;

wherein the staff scheduler includes:

at least one interface for receiving a plurality of inputs from multiple external computing devices, wherein at least a portion of the inputs are automatically received from a school district information management system on a regular periodic basis and the at least one external computing device is one of the multiple external computing devices and a processor configured to periodically execute a staff scheduling algorithm and prepare based thereon a staffing schedule report for the secondary campuses in the school district, wherein the staff scheduling algorithm generates a series of input prompts and decisions based on the plurality of inputs;

wherein at least one legal restriction is also periodically evaluated and employed by the processor to determine teaching staffing to be shared by multiple campuses, wherein said periodically evaluated is at regular and frequent intervals of time, wherein said at least one legal restriction includes at least one of:

a maximum teaching time each teacher is available;

a travel time between the multiple campuses and teacher compensation therefor for each teacher; and a union constraint, wherein the plurality of inputs includes at least courses requested by students at each campus, current teachers available in the district, current teachers' qualifications, campus facility information, which courses may be shared at multiple campuses, and which staff may be shared by multiple campuses;

wherein the staff scheduling algorithm employs the plurality of inputs, including the inputs that are automatically received, and includes at least the steps of:

determining the total number of students requesting any course, wherein the total number of students is the number of students requesting said course on said multiple campuses;

dividing an enrollment of each course by an enrollment factor to determine a quotient having an integer and remainder;

dropping the remainder from the quotient, and dividing the enrollment by the integer of the quotient to determine an average class size;

comparing the average class size with a maximum class size;

if the average class size exceeds the maximum class size, increasing the integer by one and re-dividing the enrollment by the integer;

aggregating a total number of scheduled sections for each course and aggregating a number of teachers currently assigned for each course category in a department to determine a number of teacher sections for each said course category;

providing an analysis of course categories that are under or over staffed by subtracting the total number of scheduled sections from the number of teacher sections; and periodically generating the staffing schedule report as a visual display for each of the secondary education campuses, wherein the visual display presents a column, based on the analysis, denoting course categories of departments that are understaffed, overstaffed, or no indication of a understaffed/overstaffed condition, wherein said staffing report is employed to periodically update teacher staffing schedules that are employed by teachers for staffing for each secondary education campus to satisfy the at least one legal restriction and the plurality of inputs wherein the visual display is presented as a matrix of rows, and columns for the departments, the course categories, the scheduled sections, the teacher sections and the analysis, wherein, for each of the departments, the rows include a highlighted total row with bolded font that has a count of the scheduled sections and the teacher sections, wherein the analysis for each of the course categories includes an indication of the overstaffed and a count of overstaffing if overstaffing has occurred.

9. The staff scheduling system according to claim 8, wherein the at least one external computing device is a user interface that receives data from a user in the school district, wherein the user interface is presented as a web page.

10. The staff scheduling system according to claim 8, wherein the staffing schedule report includes at least a number of scheduled course sections, a number of teacher sections by course, and an analysis regarding whether each course is under staffed, over staffed, or has a correct amount of staff.

11. The staff scheduling system according to claim 10, wherein the courses are grouped by department and category.

12. The staff scheduling system according to claim 8, wherein the facility information includes at least a list of classrooms; classroom size; room amenities, including computers, and layout; equipment resource information.

13. The staff scheduling system according to claim 8, wherein the plurality of inputs further includes state required student to teacher ratios for each course; union restrictions; and course restrictions, including grade requirements, gender restrictions, and maximum class size.

14. A method for preparing a staffing schedule report for secondary education campuses of a school district, the method comprising:
   automatically receiving data for the campuses of the school district from multiple external sources, wherein at least a portion of the data is from a plurality of inputs that are received from an information management system of the school district on a regular periodic basis,
   the data including at least courses requested by students at each of the campuses, current teachers available in the district, current teachers' qualifications, campus facility information, which courses may be shared at multiple of the campuses, and which staff may be shared by multiple campuses;
   periodically preparing, using a staff scheduling algorithm, a staffing schedule report for the campuses using the received data;
   wherein the processing and periodically preparing the staffing schedule report is performed by a processor,
   wherein at least one legal restriction is also periodically evaluated and employed by the processor to determine teaching staffing to be shared by multiple campuses, wherein said periodically evaluated is at regular and frequent intervals at time, and wherein said at least one legal restriction includes at least one of:
      a maximum teaching time each teacher is available;
      a travel time between the multiple campuses and teacher compensation therefor for each teacher; and
      a union constraint,
   wherein the staff scheduling algorithm includes at least the steps of:
      determining the total number of students requesting any course, wherein the total number of students is the number of students requesting said course on said multiple campuses;
      dividing an enrollment of each course by an enrollment factor to determine a quotient having an integer and remainder;
      dropping the remainder from the quotient, and dividing the enrollment by the integer of the quotient to determine an average class size;
      comparing the average class size with a maximum class size;
      if the average class size exceeds the maximum class size, increasing the integer by one and re-dividing the enrollment by the integer;
      aggregating a total number of scheduled sections for each course and aggregating a number of teachers currently assigned for each course category in a department to determine a number of teacher sections for each said course category;
      providing an analysis of course categories that are under or over staffed by subtracting the total number of scheduled sections from the number of teacher sections; and
      periodically generating the staffing schedule report as a visual display for each of the secondary education campuses, wherein the visual display presents a column, based on the analysis, denoting course categories of departments that are understaffed, overstaffed, or no indication of a understaffed/overstaffed condition,
   wherein said staffing report is employed to periodically update teacher staffing schedules that are employed by teachers for staffing for each campus to satisfy the at least one legal restriction,
   wherein the visual display is presented as a matrix of rows, and columns for the departments, the course categories, the scheduled sections, the teacher sections and the analysis,
   wherein, for each of the departments, the rows include a highlighted total row with bolded font that has a count of the scheduled sections and the teacher sections,
   wherein the analysis for each of the course categories includes an indication of the overstaffed and a count of overstaffing if overstaffing has occurred.

15. The method for preparing a staffing schedule report according to claim 14, wherein the multiple external sources include at least one user interface that receives data from a user in the school district, wherein the at least one user interface is presented as a web page.

16. The method for preparing a staffing schedule report according to claim 14, wherein the staffing schedule report includes at least a number of scheduled course sections, a number of teacher sections by course, and an analysis regarding whether each course is under staffed, over staffed, or has a correct amount of staff.

17. The method for preparing a staffing schedule report according to claim 16, wherein the courses are grouped by department.

18. The method for preparing a staffing schedule report according to claim 16, wherein the courses are grouped by category.

19. The method for preparing a staffing schedule report according to claim 16, wherein the data for the secondary campuses of the school district further includes at least a list of classrooms; classroom size; room amenities, including computers and layout; equipment resource information; state required student to teacher ratios for each course; union restrictions; and course restrictions.

* * * * *

UNITED STATES PATENT AND TRADEMARK OFFICE
CERTIFICATE OF CORRECTION

| | | |
|---|---|---|
| PATENT NO. | : 10,706,374 B2 | Page 1 of 1 |
| APPLICATION NO. | : 15/924083 | |
| DATED | : July 7, 2020 | |
| INVENTOR(S) | : J. Eli Crow, Kenneth L. Sikes and Shawn M. Rasure | |

It is certified that error appears in the above-identified patent and that said Letters Patent is hereby corrected as shown below:

In the Specification

In Column 8, Line 50, after --course.-- delete "In a steo" and insert --In a step--

Signed and Sealed this
Twenty-second Day of September, 2020

Andrei Iancu
*Director of the United States Patent and Trademark Office*